(12) United States Patent
Gapontsev et al.

(10) Patent No.: US 9,036,667 B2
(45) Date of Patent: May 19, 2015

(54) HIGH POWER SINGLE MODE YTTERBIUM FIBER LASER SYSTEM WITH SINGLE MODE NEODYMIUM FIBER PUMP SOURCE

(71) Applicants: Valentin Gapontsev, Worcester, MA (US); Igor Samartsev, Westborough, MA (US)

(72) Inventors: Valentin Gapontsev, Worcester, MA (US); Igor Samartsev, Westborough, MA (US)

(73) Assignee: IPG Photonics Corporation, Oxford, MA (US)

( * ) Notice: Subject to any disclaimer, the term of this patent is extended or adjusted under 35 U.S.C. 154(b) by 148 days.

(21) Appl. No.: 13/745,190

(22) Filed: Jan. 18, 2013

(65) Prior Publication Data

US 2013/0195126 A1    Aug. 1, 2013

Related U.S. Application Data

(60) Provisional application No. 61/589,078, filed on Jan. 20, 2012.

(51) Int. Cl.
*H01S 3/30* (2006.01)
*H01S 3/067* (2006.01)
(Continued)

(52) U.S. Cl.
CPC ............. *H01S 3/06708* (2013.01); *G02B 6/14* (2013.01); *H01S 3/06729* (2013.01);
(Continued)

(58) Field of Classification Search
USPC ............................................ 372/6, 64, 69–70
See application file for complete search history.

(56) References Cited

U.S. PATENT DOCUMENTS

| 7,391,561 B2 | 6/2008 | DiTeodoro et al. |
| 2002/0094159 A1 | 7/2002 | Goldberg et al. |

(Continued)

FOREIGN PATENT DOCUMENTS

JP     2011-228541 A    11/2011

OTHER PUBLICATIONS

Hou, Kai-Chung et al., "Multi-MW Peak Power Scaling of Single-Transverse Mode Pulses using 80-um Core Yb-doped LMA Fibers", Solid State Diode Laser Technology Review, 2006.
(Continued)

*Primary Examiner* — Dung Nguyen
(74) *Attorney, Agent, or Firm* — Yuri Kateshov, Esq.; Timothy J. King, Esq.

(57) ABSTRACT

A high power fiber laser system emitting a substantially diffraction limited beam with a Gaussian intensity profile includes a single mode ("SM") neodymium fiber pump source outputting a SM pump light; a seed laser operative to emit a SM signal light at a wavelength greater than that of the pump light; a SM DWM receiving and multiplexing the SM pump and signal lights. The disclosed system further includes a booster fiber amplifier which is configured with a frusto-conically-shaped ytterbium ("Yb") doped core receiving the pump and signal lights and configured with a small diameter input end which supports only a SM and a large diameter output end which is capable of supporting the SM and high order modes (:HOM"). The booster further has a cladding surrounding and coextending with the core, the core being configured for having intensity profiles of respective SMs of pump and signal lights overlap one another so that an overlap integral substantially equals to one (1) along an entire length of the core. The SM of the light signal extracts substantially the entire energy from the pump mode leaving the HOMs without amplification necessary to affect a quality of the diffraction limited beam of the system in a MW peak power range and hundreds of watt average power range.

29 Claims, 5 Drawing Sheets (51) Int. Cl.
  *G02B 6/14* (2006.01)
  *H01S 3/16* (2006.01)
  *H01S 3/08* (2006.01)
  *H01S 3/094* (2006.01)

(52) U.S. Cl.
  CPC ........ H01S 3/06745 (2013.01); H01S 3/06754 (2013.01); *H01S 3/1618* (2013.01); *H01S 3/08045* (2013.01); *H01S 3/094042* (2013.01); *H01S 3/1611* (2013.01); *H01S 2301/03* (2013.01)

(56) References Cited

U.S. PATENT DOCUMENTS

2004/0114858 A1    6/2004  Komine
2009/0208877 A1*   8/2009  Carter .......................... 430/321
2009/0251770 A1*  10/2009  Lewis ........................ 359/341.3
2010/0247047 A1    9/2010  Filippov et al.
2011/0058250 A1*   3/2011  Liu et al. .................... 359/341.3
2011/0064097 A1    3/2011  Gapontsev et al.
2011/0310913 A1   12/2011  Frith

OTHER PUBLICATIONS

Di Teodoro, F. and Brooks, C.D., Multistage Yb-doped fiber amplifier generating megawatt peak-power, subnanosecond pulses, Optics Letters, 30(24): Dec. 15, 2005.

Marcuse, Dietrich, "Mode Conversion in Optical Fibers with Monotonically Increasing Core Radius," Journal of Lightwave Technology, LT-5(1): Jan. 1987.

* cited by examiner

HIGH POWER SINGLE MODE YTTERBIUM FIBER LASER SYSTEM WITH SINGLE MODE NEODYMIUM FIBER PUMP SOURCE

BACKGROUND OF THE DISCLOSURE

1. Field of the Disclosure

The disclosure relates to an optical amplifier configured with a short, active optical fiber to emit a single mode, high peak/average power bright output, and a single mode high power fiber laser system incorporating the optical amplifier and operative to emit an ultra bright, high power single mode pulsed or continuous wave ("CW") emission.

2. Prior Art Discussion

Fiber laser systems including Ytterbium ("Yb"), Erbium ("Er") and other rare-earth ion-doped fibers are highly efficient, cost-effective, compact and rugged light generating and light amplifying devices. Among these, Yb and Er continuous wave (CW) and pulsed fiber laser systems dominate the industrial fiber laser market mainly due to their excellent efficiency and long term stability.

Rare-earth doped fiber lasers and amplifiers represent robust, efficient and compact optical sources capable of emitting a high quality beam of highly controlled spectral quality. The output power generated by these sources is limited, however, by parasitic nonlinear optical effects ("NLE").

Nonlinear effects ("MILE") include stimulated Brillouin and Raman scattering (SBS and SRS), self- and cross-phase modulation (SPM and XPM), and four-wave mixing (FWM). The common origin of these effects is
- high optical intensities in the fiber core, and long path for the nonlinear interaction between the in-fiber optical beam and fiber material (e.g., silica), i.e., long fibers.

These effects are observed in doped fibers integrated in both high power continuous wave and high peak power pulsed fiber laser systems. In the context of high power pulsed lasers, NLEs cause, among others, unwanted spectral broadening and distortion of the pulse temporal profile.

Different NLEs have a number of commonalities. For example, an optical threshold power at which nonlinear effects manifest themselves is proportional to the fiber core area and inversely proportional to the fiber length. In other words, as the length of fibers increases and the core diameter decreases, the threshold power for NLEs becomes progressively lower. Accordingly, for high powers, a need always exists for large core diameters and short fiber lengths.

Optical fibers supporting propagation of light that may have a single mode are referred to as single mode ("SM") fibers, whereas those supporting multiple transverse modes of radiation are called multimode ("MM") fibers. SM fibers emit the highest beam quality having a Gaussian intensity shape for fibers with a step index profile.

Among multiple modes supported by the core of MM step index fibers, the most powerful fundamental mode has a profile very similar to a Gaussian. High order modes ("HOM") are characterized by respective profiles of optical intensity which differ from a Gaussian and from one another. For a given step index, the number of transverse modes supported by a fiber is proportional to the core area. Therefore, large-core fibers tend to be multimode ("MM") and, when modes are excited, emit a beam with the beam quality lower than that of SM fibers. The quality of the beam is critical for many industrial and scientific applications of high power fiber laser systems which include MM active fibers with large fiber core diameters. To meet the quality requirements, MM cores may be configured to support substantially only a fundamental mode.

The above-mentioned nonlinear effects ("NLE") are extensively analyzed by the known prior art. One of the techniques providing the reduction of the number of transverse modes includes bend-loss-induced mode selection disclosed in U.S. Pat. No. 6,496,301, which is entirely incorporated herein by reference. Still another technique includes mode-matched launching between spliced directly to one another SM and MM fibers as developed by IPG Photonics Corporation. Both techniques are widely and successfully used in high power fiber laser systems ("HPFLS"). However, because of a need for increasingly higher powers, modern fiber amplifiers are dangerously close to their limits due to detrimental NLEs.

To minimize the undesirable presence of NLEs in a doped fiber, which is incorporated in HPFLSs with an output in a kW-MW range, it is necessary to configure rare earth ion-doped fibers with:
1. the smallest optimal length, which desirably approaches the length of an optical Rod—a short, straight optical component providing the undisturbed propagation of SM beam with practically no bending losses; and
2. the largest possible MFD of the fundamental mode to reduce light and therefore increase NLE thresholds.

As to the best knowledge of the inventors, most currently available fiber designs used in ultra-high average and peak power fibers amplifiers cannot adequately meet the above-articulated requirements.

The length of doped fibers also affects the quality of the fundamental mode. As the latter propagates through a meter(s)-long fiber, it tends to shift of the mode center gravity due to the bending of the MM fiber. As a result of it, the mode area is decreased. When doped long fibers are pumped, the overlap between intensity profiles of respective pump and fundamental modes, allowing the amplification of substantially only the fundamental mode, worsens. Hence HOMs, initially not amplified, start compromising the quality of the output beam, since the power lost by the fundamental mode transfers to HOMs. Accordingly, it is highly desirable that this overlap, known as the overlap integral, be as close to 1 as possible along the entire length of the fiber. Clearly, the latter is easier to realize in fibers with lengths not exceeding a few tens of centimeters.

Having established a need for optimal fiber configurations in MM HPFLSs in SM operations, the next step is to generate and absorb high power pump light in a fiber amplifier with the length measured in no more than a few tens of centimeters. One of the possibilities includes increasing a dopant concentration. But the latter cannot be inconsequentially increased above a certain level. For example, even at currently known maximum practical dopant concentration levels, double clad Yb-doped fibers at a 1060 nm wavelength typically reach a few meters. Such a fiber length, thus, creates favorable conditions for a low NLE threshold power. Furthermore, although high power MM laser diodes can be used in this configuration, it is known that their output is not sufficiently bright; yet many of the known industrial applications require highly bright beams.

An end-core pumping technique including launching SM pump light into the fiber core, of course, improves pump light brightness and absorption. However, as known to the artisan in the laser arts, even the most powerful, currently available SM laser diodes individually are not nearly sufficient for generating the desired powerful pump light for HPFLSs operative to emit MW peak and hundreds of W average power outputs.

A need therefore exists for an optical Yb-doped fiber amplifier operative to emit SM beams with average and peak powers in a kW-MW power range in about 976-1030 nm wavelength range.

Another need exists for the optical Yb-doped fiber amplifier based on a doped fiber which is no more than few centimeters long and thus thus configured to prevent generation of NLEs at low threshold powers.

Another need exists for a neodimium ("Nd") fiber pump source operative to emit a SM bright pump signal of up to several hundred watts in the desired 910-960 nm wavelength range.

Another need exists for an end pumping arrangement including the described above Nd fiber pump source and Yb fiber amplifier.

Still another need exists the Yb fiber amplifier and SM Nd pump source which are configured so that an overlap integral between a pump mode, launched into the core end of the Yb-doped fiber, and single/fundamental modes, excited in the Yb fiber upon launching the pump light, is substantially equal to 1 along the entire length of the Yb-doped fiber.

Still another need exists for an ultra high power system configured with a booster, which has a short, straight doped fiber and capable of amplifying a signal light to a kW-MW range in the desired wavelength range, the SM pump source, which emits pump light at a λp wavelength, a seed laser which emits the signal light at a λs wavelength >λp, and a SM fiber wavelength division multiplexer ("WDM") combining the signal and pump lights upstream from the booster.

SUMMARY OF THE DISCLOSURE

These and other needs are satisfied by the disclosed fiber amplifier and high power fiber laser system incorporating the fiber amplifier (also referred to as booster—last, most powerful amplifying stage in multi-cascaded fiber amplification systems). The disclosed fiber laser system is configured to emit MW output peak powers and at least hundreds of W output average powers in a single mode within a 976-1030 nm wavelength range.

The fiber amplifier includes an Yb-doped waveguide, such as optical fiber-rod, extending along a longitudinal axis, and a SM Nd fiber pump source emitting a SM pump light of up to several hundred watts preferably in a 910-960 nm wavelength which is coupled into the input end of the fiber's core.

The amplifier is further configured with a short, straight Yb-doped fiber-rod having a monolithic core and a cladding which surrounds and extends coaxially with the core. The core is configured with a generally frustoconical elongated cross-section flaring towards the large-diameter output end of the Yb-doped fiber. The input end region of the core is structured to support only a SM, whereas the core's output end region may support a fundamental mode and few HOMs.

The Yb-doped fiber-rod is configured so that the SM pump and core fundamental modes overlap one another along the entire short fiber length so that the overlap integral is substantially equal to one. Accordingly, even if a few HOMs are excited along the length of the core, practically only the exited SM/fundamental mode is amplified so that the presence of HOMs amounts to an insubstantial low noise level. Moreover, HOMs not only remain unamplified, but also they may be saturated rendering the beam emitted from the output core's end nearly diffraction limited in about 976-1030 nm wavelength band. The disclosed structure, thus, makes the use of so-called central doping unnecessary.

The disclosed ultra high power system has a booster including the above discussed Yb amplifier and the SM Nd fiber laser source which together define an end pumping arrangement. The system further includes a SM seed laser emitting a SM signal light at a wavelength which is greater than that of the Nd pump. The seed signal, like the pump signal, is also launched into the core input of the Yb amplifier. The coupling of SM pump and seed signal into the Yb-doped core is realized by a SM fiber wave division multiplexer ("DWM") operative to combine both signals which are delivered to the core's end through a passive SM fiber so that Gaussian profiles of respective pump and excited single modes are fully overlapped along the entire length of the Yb-doped fiber.

BRIEF DESCRIPTION OF THE DRAWINGS

The above and other features and advantages will become more readily apparent from a further specific description accompanied by the following drawings, in which.

SPECIFIC DESCRIPTION

Figure 1:
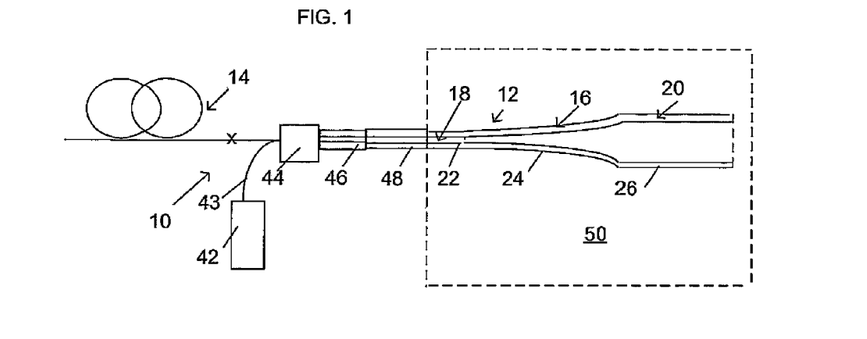
FIG. 1 is an optical schematic of high power fiber laser system ("HPFLS") configured in accordance with the disclosure.

Reference will now be made in detail to several embodiments of the disclosure that are illustrated in the accompanying drawings. Wherever possible, same or similar reference numerals are used in the drawings and the description to refer to the same or like parts. The drawings are in simplified form and are not to precise scale.

FIG. 1 illustrates a high power SM fiber laser system 10 used in a CW or pulsed regime and operative to emit an output in a single fundamental mode on a kW-MW scale in about a 976-1030 nm wavelength range. The system 10 is, thus, an ultra-high power configuration operative to emit a highly bright, substantially diffraction-limited beam, and has a compact, rugged structure due to the disclosed below geometry of an Yb fiber amplifier or booster 12 and a single mode Nd fiber laser pump source 14.

The Yb fiber amplifier/booster 12 is configured with an active fiber rod 16 having an Yb ion-doped core 18 and a cladding 20 surrounding the core. The fiber rod as used here is an optical waveguide thick enough to readily hold its shape when released. The fiber rod 16 is no more than 50 centimeter long and, and in a particularly advantageous configuration, the fiber length is about between 5 and 30 centimeters. The fiber rod 16 is monolithic, tapered and straight. The cladding 20 may have a cross-section similar to core 18, or may be provided with a uniform outer diameter along the entire length of fiber rod 16. The booster is packaged in a housing 50, such as a fiber laser head. The input and output ends of core 18 are small enough to be spliced to other fibers.

The Yb fiber rod 16 is configured to maintain substantially a single transverse mode with operation at a peak power on a MW scale. These high power levels are obtained because fiber rod 16 is short, straight, and has a large mode field diameter of a fundamental mode which fully overlaps a pump mode along the entire fiber length, as discussed below.

The fiber rod 16 is configured to emit a practically diffraction-limited output beam due to 1. fiber rod's geometry and 2 end-core pumping arrangement, which is disclosed hereinbelow. The geometry of fiber rod 16 includes multiple regions together generally defining a frustoconically-shaped cross-section if viewed along the central longitudinal axis of fiber rod 16.

The Yb-doped core 18 of fiber rod 16 thus has a single-mode input end region 22 typically having core 18 and cladding 20 provided with respective uniform diameters. Accordingly, only one mode having a Gaussian intensity profile is excited by a SM pump signal launched into input region 22 of straight core 18. Both the pump and exited single modes have respective matching mode field diameters ("MFDs") and shapes of Gaussian intensity profiles. To increase the MFD of the fundamental mode and, therefore, reduce high intensities, also contributing to generation of NLEs, respective MFDs of the single and pump modes have to be increased. This is realized by the geometry of core 18 having a transitional tapered region 24 which adiabatically expands, i.e., the MFDs of respective pump and exited SMs increase while their intensity profiles substantially fully overlap one another. This overlap allows a maximum possible extraction of energy from the pump light by the fundamental mode which thus prevents amplification of HOMs along the downstream of transition region 18 and further through the entire length of output end region 26. In other words, the overlap integral is substantially equal to 1 along the entire length of fiber 16. The output region 26 has a uniform diameter larger than that of input region 22 and configured to support a few modes. However, because of the short length and mentioned above overlap between single and pump modes' intensity profiles, the probability of HOM excitation in core output end region 26 is unlikely.

Figure 1A:
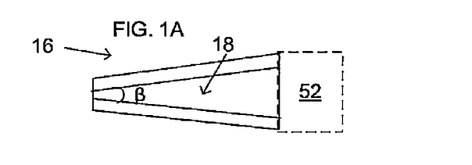
FIG. 1A illustrates an embodiment of an Yb-doped fiber of the HPFLS sown in FIG. 1.

Referring to FIG. 1A, the shape of Yb-doped fiber 16 may vary preserving, however, its generally frustoconical cross-section. For example, Yb-doped fiber may be configured with a conical body having the transition region extend between the opposite ends. Due to the core launching of the SM pump light, overlap integral of about 1 and dimensions of fiber 16, the configuration shown in FIG. 1A has the same amplifying mechanisms as the configuration of FIG. 1.

Referring to both configurations of FIGS. 1 and 1A, respectively, Yb fiber 16 may be configured so that at a certain point along a light path, the fundamental mode stops expanding while the core still enlarges. In other words, the mode expands at angle smaller that a cone angle β seen in FIG. 1A. In this case, the single mode stops contacting the core's inner periphery. Accordingly, at this point a fully doped component 52 can be coupled to the output end of Yb-doped fiber 18 so as to spike the peak power to even higher MW levels.

Figure 2:
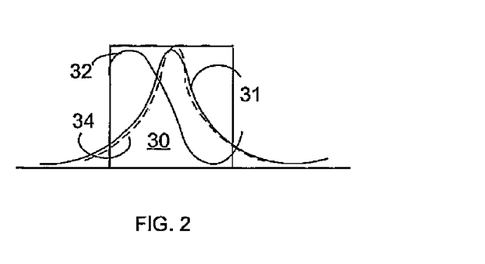
FIG. 2 illustrates a refractive step-index of the fiber core and intensity profiles of a fundamental mode of signal light and that of pump, respectively, cooprpagating int the core of the disclosed Yb-doped fiber shown in FIG. 1.

FIG. 2 illustrates a refractive step-index of fiber rod 16 with a core area 30 of output end region 26. Under typical conditions even in such a short fiber length like fiber rod 16, this large a core may be capable of waveguiding a few modes including a fundamental mode 30 and a few HOM 32. The fundamental mode 31 has a Gaussian intensity profile. The HOMs 32 (only one HOM is shown) occupy peripheral regions of core 30. Looking at this figure, it is clear that in order to radically minimize deterioration of the diffraction limited output beam, the HOM should NOT be amplified in response to launching of pump light. Conversely, the fundamental mode should be maximally amplified.

The latter is attained, In accordance with the disclosure, by having intensity profiles of respective fundamental and pump modes 31, 34 practically fully coincide (about 99% and higher) with one another not only along input and transitional regions 22, 24, respectively, but also along the core's output end region 26. In other words, the fundamental mode extracts maximal energy from the pump mode along the entire length of fiber rod 16 because both MFD and shape of pump mode 34 match respective MFD and shape of single/fundamental mode 30. Therefore, the overlap integral is substantially equal, to one (1) along the entire length of fiber rod 16. Therefore, HOMs are reduced to insignificant noise levels that do not noticeably affect the beam quality.

Figure 3:
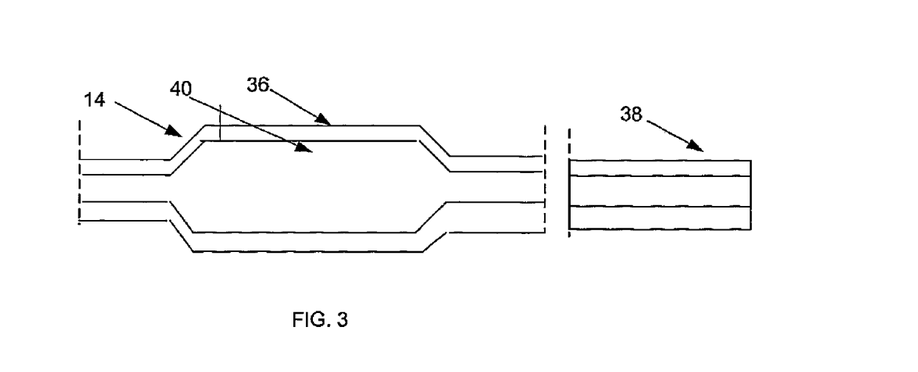
FIG. 3 illustrates a diagrammatic configuration of a pump source of the HPFLS of FIG. 1.

FIG. 3 illustrates an exemplary configuration of pump source 14 including a Nd SM fiber laser. The source 14 may be configured as a gain block with Nd doped fiber 36 and a pump-light delivering passive fiber 38. The core 40 of active fiber 36 may be surrounded by one or multiple claddings coextending with the core. The geometry of active fiber 36, i.e. the cross-sections of respective core and cladding along the longitudinal fiber axis, may have a double bottleneck-shaped cross-section as disclosed in PCT/US10/051743 which is fully incorporated herein by reference and commonly owned with the present application. The latter includes a narrowly-dimensioned input end region, uniformly dimensioned absorption central or mid-region, which has an area Acore larger than that one of the input region, and a frusto-conical input transformer region bridging the end and mid core regions. To complete the double bottleneck section, core 40 further has output frustoconical transformer and end regions. Other configurations of core 40 including a typical uniform diameter fiber core can be used instead of the shown double neck-shaped cross-section without affecting the performance of booster 12. Regardless of the configuration, the disclosed Nd-doped laser is operative to deliver an ultra bright SM pump light signal with powers reaching several hundred watts.

Returning to FIG. 1, system 10 further includes a seed laser source 42 emitting a single mode signal light at the wavelength λs which ranges between about 976 and 1030 nm. The seed source 42 may be configured as a fiber or semiconductor laser. The signal light is guided along a delivery fiber 43 that advantageously may be configured as a polarization maintaining fiber (PMF). Note that the desired polarization will be maintained in Yb-doped fiber 16 even if the latter is not PM-configured due to its geometry.

With the use of the SM pump light, system 10 can utilize a single mode WDM 44 multiplexing the signal and pump lights coupled into a core of passive fiber 46 which delivers them to a SM passive input fiber 48 of booster 12. The WDM 44 has preferably a fiber configuration, but very well may be be constructed differently. While geometrical core dimensions of respective fibers 48 and 16 may or may not be uniform, their intensity profiles have respective MFDs and shapes substantially match one another.

The system 10 is encased in diagrammatically illustrated housing 50 configured to protect fiber components from mechanical stresses and dimensioned so that Yb active fiber 16 extends linearly without bents. Overall, the system is very compact due to a short fiber length of fiber 16 which can be as small as about 10 centimeters.

The Yb-doped fiber 16 may have different configurations. For example, it may be made in accordance with photon-crystal-fiber technology. Alternatively, a glass rod—bulk optics—with a diameter of about 1 millimeter or more can be used as well. In case of the latter, it can have a waveguide region with, for example, the geometry shown in FIG. 1A. As one of ordinary skill is well aware, the power threshold for NLEs in bulk optics may be higher than that of a fiber, which allows even further scaling of peak powers. Although the number of excited HOMs in the rod may be relatively significant, these modes are even further removed from the central core zone where the fundamental and pump modes overlap each other. As a result, the HOMs are not amplified and thus practically do not affect the diffraction limited at the output of the rod.

Extensive experimental data has been obtained for Yb-doped amplifier 12 is somewhat reflected in FIGS. 4-13. One of numerous experiments features fiber 16 generally having a bottleneck shape with 0.1 cm-long input region 22, 1 cm-long transitional region 24 and 15 cm-long output region 26. Despite being a non-exclusive example, the above-described geometry of the Yb fiber illustrates certain tendencies for the disclosed amplifier as disclosed hereinbelow.

Figure 4:
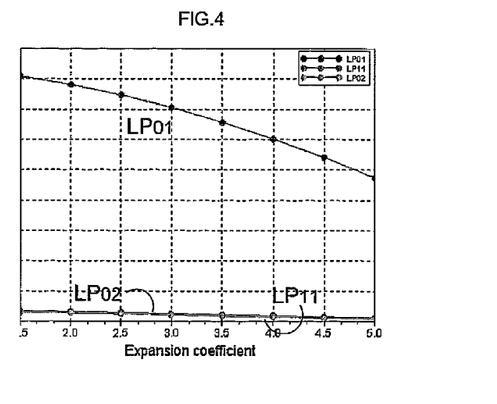
FIG. 4 is a computer-generated graph illustrating output powers of fundamental mode LP01 and two HOMs LP11 and LP02, respectively, in the amplifier shown in FIGS. 1 and 1A.

FIG. 4 is a graph illustrating output powers of fundamental mode LP01 and two HOMs LP11 and LP02, respectively, in amplifier 12. It is easy to see how little power is in HOMs LP11 and LP02 compared to fundamental mode LP01.

Figure 5:
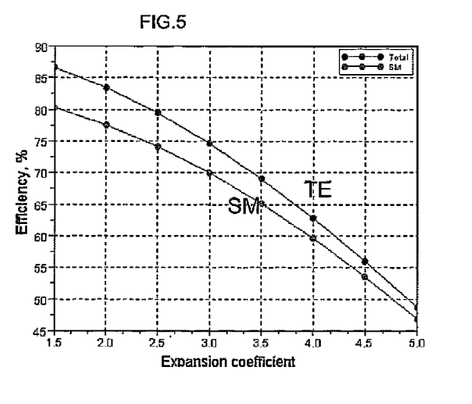
FIG. 5 illustrates a computer-generated graph of the overall efficiency of the disclosed amplifier and the efficiency of fundamental mode LP01 as a function of an expansion coefficient Doo:Doi, where Doo and Doi are respective outer diameters of input and output regions of the doped core.

FIG. 5 illustrates the overall efficiency of amplifier 12 and the efficiency of fundamental mode LP01 as a function of an expansion coefficient determined as a Doo:Doi ratio, where Doo and Doi are respective outer diameters of input and output regions 22, 26, respectively. It is assumed that the diameters of respective input and output core regions have the same ratio. As the expansion coefficient increases, both efficiencies worsen. Base on other parameters and tendencies disclosed hereinbelow, the expansion coefficient between 3 and 5 is found to be optimal at least for the parameters of amplifier 12 selected for these experiments. The expansion coefficient exceeding 5 is accompanied by prohibitively amplified spontaneous emission.

Figure 6:
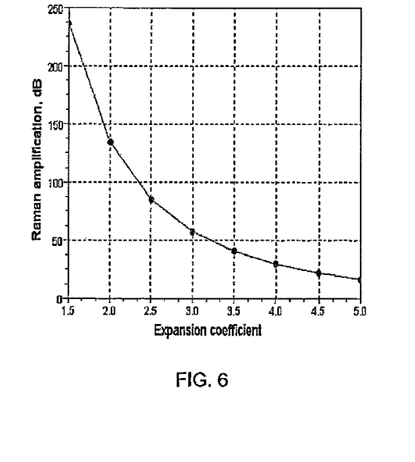
FIG. 6 illustrates computer-generated graph of the amplification of a parasitic Raman signal as a function of the expansion coefficient.

FIG. 6 illustrates the amplification of one NLEs—Raman scattering as a function of the expansion coefficient. In contrast to FIG. 5, the larger the coefficient, the lower the amplification of the Raman scattering. As shown, the expansion coefficient varying between 3 and 4.5 provides minimal amplification of parasitic Raman signal which is practically nonexistent around the 4.5 coefficient.

Figure 7:
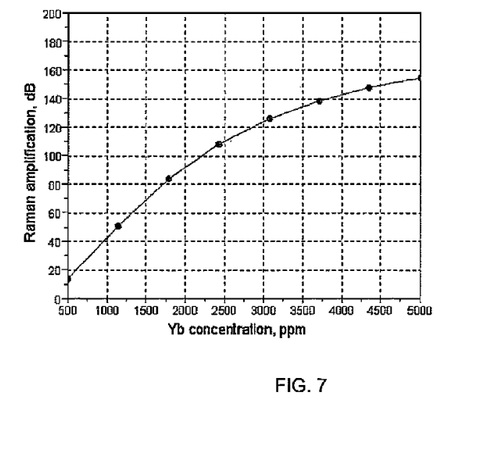
FIG. 7 shows computer-generated graph of the amplification of the parasitic Raman signal on a logarithmic scale as a function of Yb ion concentration.

FIG. 7 shows the amplification of Raman on a logarithmic scale in dBs as the concentration of Yb ion concentration increases. It has been shown that the Yb concentration varying between about 1000 and 7000 ppm is optimal for various wavelengths.

Figure 8:
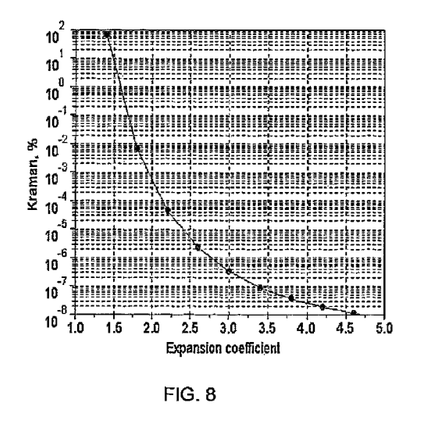
FIG. 8 illustrates computer-generated graph of the dependency of the parasitic Raman signal percentage from the expansion coefficient.
Figure 9:
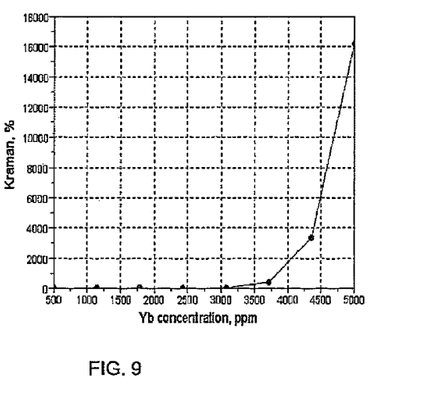
FIG. 9 illustrates computer-generated graph of the dependency of the parasitic Raman signal from the Yb-ion concentration.

FIG. 8 illustrates the dependency of Raman percentage from the expansion coefficient. Again, the range of the latter varying between about 3 and 4.5 corresponds to the minimal presence of Raman. FIG. 9 shows that Raman starts manifesting itself at the Yb ion concentration above 3000 ppm.

Figure 10:
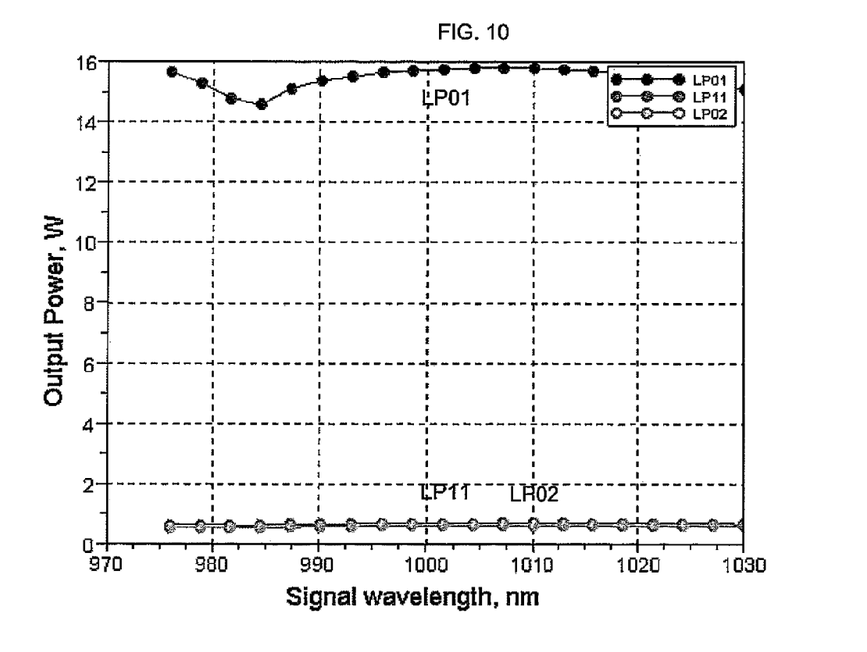
FIG. 10 shows computer-generated graph of the output power in fundamental mode LP01 and HOMs LP11 and LP02, respectively as a function of wavelength.
Figure 11:
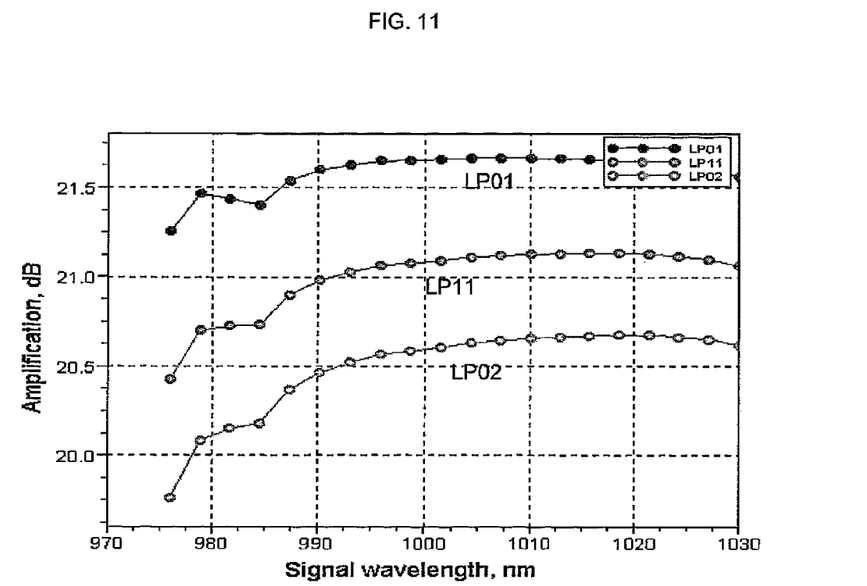
FIG. 11 illustrates a computer-generated graph of the amplification of fundamental mode LP01 and HOMs LP11 and LP02, respectively, on a dB scale.

FIG. 10 shows the output power in fundamental mode LP01 and HOMs LP 11 and LP02, respectively as a signal wavelength varies from about 976 nm to 1030 nm. Practically, HOMs have no meaningful power at either 976 nm or 1030 nm. FIG. 11 indicates that amplification of fundamental mode LP01 on a dB scale is higher than that of respective HOMs LP11 and LP02.

Figure 12:
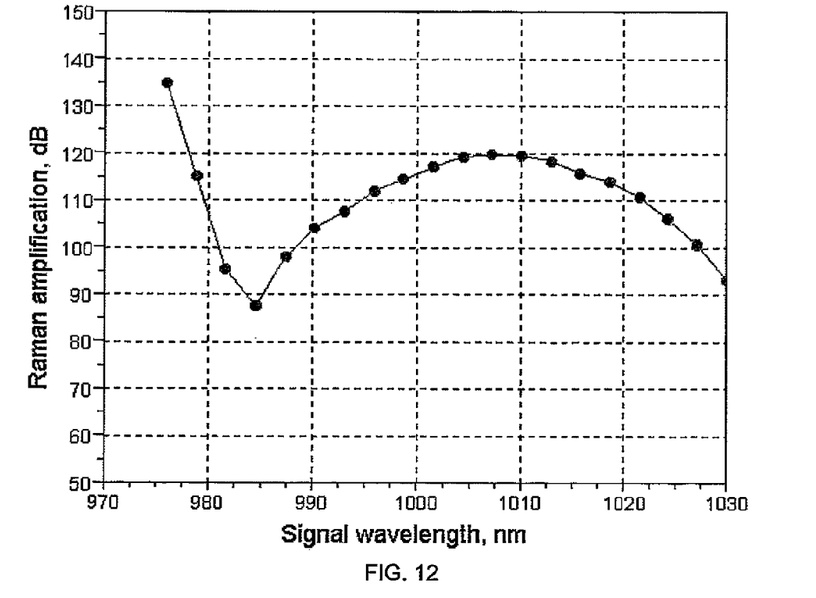
FIG. 12 illustrates a computer-generated graph of the amplification of the parasitic Raman signal on a logarithmic scale as a function of signal wavelengths.

FIG. 12 illustrates Raman amplification on a logarithmic scale at different signal wavelengths. As can be seen, this parameter, like many others discussed above, does not precipitously change. at respective 976 nm and 1030 nm wavelength peaks.

Figure 13:
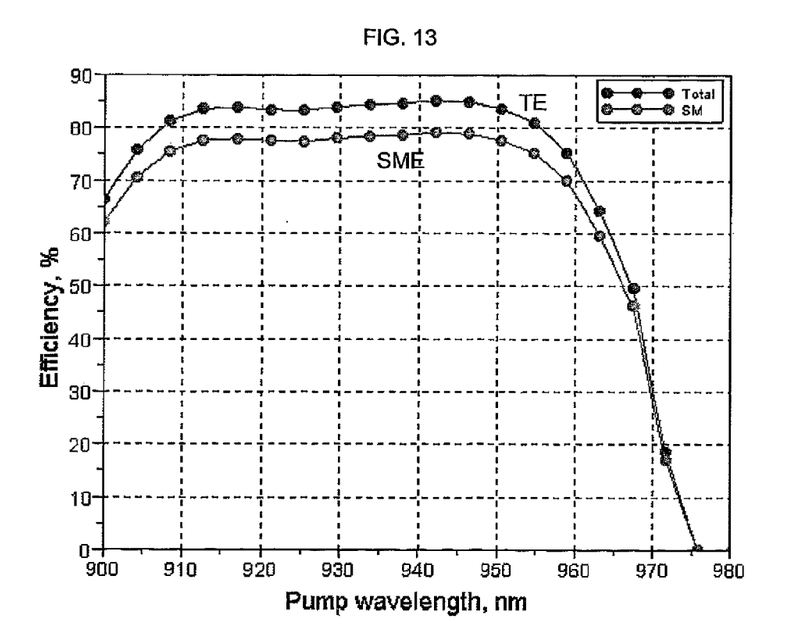
FIG. 13 illustrates a computer-generated graph of the overall efficiency of the amplifier of FIGS. 1 and 1A as a function of pump wavelength.

FIG. 13 confirms that the high overall efficiency TE of amplifier 12 at a pump wavelength in a 900-975 nm range is primarily obtained in about 910-960 nm pump wavelength range. Not surprisingly, the high total efficiency is a result of the high efficiency of the SM within the same pump wavelength range.

In summary, the disclosed booster is a straight, short and gradually expanding towards its output Yb-doped fiber rod operative to maintain and emit a single transverse mode beam in a kW-MW power range with operation in a CW or sub-nanosecond pulse regime. Currently, a 20 cm long frustoconical Yb fiber (booster), with a numerical aperture smaller than 0.003, an expansion coefficient between 3 and 5 and dopant concentration between about 2000 and 4000 ppm in a 976-1030 nm range is capable of emitting SM picosecond pulses each at about 1 MW power. Preserving the same parameters but increasing the coefficient of expansion, output peak powers can reach tens of MWs.

The short, straight and frustoconical configuration of the booster is core end-pumped by up to several hundred watts SM pump light emitted by a SM Nd pump source. Due to its geometry, the booster is characterized by high threshold powers for NLEs which along with high power SM pump light allow the booster to amplify signal light at desired 976 nm and 1020 nm wavelengths to MW levels of peak power. The booster is invariably characterized by high efficiency that may exceed 90% and substantially higher amplification of the SM than that of HOMs, which thus are reduced to insignificant noise levels, in a pump wavelength range between about 915 and 950 nm range.

Although the present disclosure has been described in terms of the disclosed example, numerous modifications and/or additions to the above-disclosed embodiments would be readily apparent to one skilled in the laser arts without departing however from the scope and spirit of the following claims.

The invention claimed is:

1. A light amplification fiber system outputting a signal light in a single mode emission, comprising:
    a single mode ("SM") neodymium fiber pump source outputting a SM pump light; and
    a straight waveguide receiving the SM pump light and comprising:

a frustoconically-shaped ytterbium ("Yb") doped core having a small diameter input end which is configured for supporting a SM of the signal light and a large diameter output end capable of supporting the SM and high order modes (HOMs) of the signal light, a cladding surrounding and coextending with the core, the core being configured to have the SM of the signal light overlap the SM of the pump light so that an overlap integral between the SMs substantially equals to one (1) along an entire length of the core, wherein the SM of the light signal extracts substantially an entire energy from the SM of the pump light leaving the HOMs without amplification necessary to affect a quality of the SM emission of the system.

2. The light amplification fiber system of claim 1, wherein the core has a length varying between about five (5) and about thirty (30) centimeters.

3. The light amplification fiber system of claim 1, wherein the core is configured with a coefficient of expansion Do:Din varying between about 2 and 5 with the Dce being a core diameter of the output end and Din being a core diameter of the input end.

4. The light amplification fiber system of claim 1, wherein the core is configured to emit the SM radiation at a peak power of up to tens of MWs and an average power of up to hundreds of watts.

5. The light amplification fiber system of claim 1, wherein the Yb ions are doped in the core at concentration levels varying between about 1000 and 7000 ppm.

6. The light amplification fiber system of claim 1, wherein the signal light is emitted in a 976-1030 nm wavelength range.

7. The light amplification fiber system of claim 1, wherein the waveguide has a configuration of a fiber rod capable of remaining, straight upon removing a load from the waveguide.

8. The light amplification fiber system of claim 1, wherein the core and cladding are configured so that the waveguide is provided with a numerical aperture smaller than 0.003.

9. The light amplification fiber system of claim 1, wherein the cladding is configured with a cylindrically-shaped cross-section or frustoconically-shaped cross-section.

10. The light amplification fiber system of claim 1, wherein the input region is at most a few millimeter long and has a substantially uniform diameter.

11. The light amplification fiber system of claim 1, wherein the core further has a tapered transition core region extending between the ends so that the core is provided with a bottleneck shaped cross-section.

12. The light amplification fiber system of claim 1, wherein the core has a cone-shaped cross-section.

13. The light amplification fiber system of claim 1, wherein the frustoconically-shaped core is configured so that the SM signal light expands along a downstream potion of the output end region at an angle smaller than a cone angle.

14. The light amplification fiber system of claim 13 further comprising a fully doped optical component having an area larger than that of the output end of the core and coupled thereto.

15. The light amplification fiber system of claim 1, wherein the SM Nd pump source is configured with an active fiber doped with Nd ions and having a cylindrical cross-section or double bottleneck cross-section.

16. A high power fiber laser system emitting a substantially diffraction limited beam with a Gaussian intensity profile, comprising:

a single mode ("SM") neodymium fiber pump source outputting a SM pump light;

a seed laser operative to emit a SM signal light at a wavelength greater than that of the pump light;

a SM DWM receiving and multiplexing the SM pump and signal lights; and a booster fiber amplifier comprising:

a frustoconically-shaped ytterbium ("Yb") doped cote receiving the pump and signal lights and configured with a small diameter input end which supports only a SM and a large diameter output end which is capable of supporting the SM and high order modes ("HOM");

a cladding surrounding and coextending with the core, the core being configured for having intensity profiles of respective SMs of pump and signal lights overlap one another so that an overlap integral substantially equals to one (1) along an entire length of the core, wherein the SM of the light signal extracts substantially an entire energy from the pump mode leaving the HOMs without amplification necessary to affect a quality of thesubstantially diffraction limited beam of the system in a MW peak power range and hundreds of watts average power range.

17. The high power fiber system of claim 16, wherein the core has a length varying between about five (5) and about thirty (30) centimeters.

18. The high power fiber system of claim 16, wherein the core is configured with a coefficient of expansion Do:Din varying between about 2 and 5 with the Dce being a core diameter of the output end and Din being a core diameter of the input end.

19. The high power fiber system of claim 16, wherein the Yb ions are doped in the core at concentration levels varying between about 1000 and 7000 ppm.

20. The high power fiber system of claim 16, wherein the signal light is emitted in a 976-1030 nm wavelength range.

21. The high power fiber system of claim 16, wherein the waveguide has a configuration of a fiber rod capable of remaining straight upon removing a load from the waveguide.

22. The high power fiber system of claim 16, wherein the core and cladding are configured so that the waveguide is provided with a numerical aperture smaller than 0.003.

23. The high power fiber system of claim 16, wherein the cladding is configured with a cylindrically-shaped cross-section or frustoconically-shaped cross-section.

24. The high power fiber system of claim 16, wherein the input region is at most a few millimeter long and has a substantially uniform diameter.

25. The high power fiber system of claim 16, wherein the core further has a tapered transition core region extending between the ends so that the core is provided with a bottleneck shaped cross-section.

26. The high power fiber system of claim 16, wherein the core has a cone-shaped cross-section.

27. The high power fiber system of claim 16, wherein the frustoconically-shape core is configured so that the SM signal light expands along a downstream potion of the output end region at an angle smaller than a cone angle.

28. The high power fiber system of claim 26 further comprising a fully doped optical component having an area larger than that of the output end of the core and coupled thereto.

29. The high power fiber system of claim 16, wherein the SM Nd pump source is configured with an active fiber doped with Nd ions and having a cylindrical cross-section or double bottleneck cross-section.

* * * * *